United States Patent
Weiss

(10) Patent No.: US 10,136,303 B2
(45) Date of Patent: Nov. 20, 2018

(54) SYSTEM AND METHOD FOR PROVIDING LOCATION INFORMATION

(75) Inventor: Andrew Weiss, San Ramon, CA (US)

(73) Assignee: Location Labs, Inc., Emeryville, CA (US)

(*) Notice: Subject to any disclaimer, the term of this patent is extended or adjusted under 35 U.S.C. 154(b) by 786 days.

(21) Appl. No.: 13/345,118

(22) Filed: Jan. 6, 2012

(65) Prior Publication Data

US 2013/0179114 A1  Jul. 11, 2013

(51) Int. Cl.
- *H04W 8/10* (2009.01)
- *H04W 4/20* (2018.01)
- *H04W 4/02* (2018.01)

(52) U.S. Cl.
CPC ............ *H04W 8/10* (2013.01); *H04W 4/20* (2013.01); *H04W 4/02* (2013.01)

(58) Field of Classification Search
CPC ........ G01C 15/00; H04W 4/025; H04W 8/10; H04W 4/20; H04W 4/02
See application file for complete search history.

(56) References Cited

U.S. PATENT DOCUMENTS

| | | | | |
|---|---|---|---|---|
| 5,485,163 | A * | 1/1996 | Singer | G01S 5/0054 340/7.27 |
| 7,995,988 | B2 * | 8/2011 | Filizola et al. | 455/404.2 |
| 8,447,325 | B2 | 5/2013 | Anakata et al. | |
| 8,504,057 | B2 | 8/2013 | Choi | |
| 2003/0060197 | A1 * | 3/2003 | Benes | H04W 4/02 455/433 |
| 2006/0223518 | A1 | 10/2006 | Haney | |
| 2007/0037582 | A1 * | 2/2007 | Mohi et al. | 455/456.1 |
| 2007/0298793 | A1 | 12/2007 | Dawson | |
| 2008/0068257 | A1 * | 3/2008 | Mizuochi | G01S 19/40 342/357.23 |
| 2008/0133599 | A1 | 6/2008 | Stewart et al. | |
| 2008/0171555 | A1 | 7/2008 | Oh et al. | |
| 2008/0254810 | A1 | 10/2008 | Fok et al. | |
| 2008/0261622 | A1 * | 10/2008 | Lee et al. | 455/456.2 |
| 2009/0287546 | A1 * | 11/2009 | Gillespie et al. | 705/10 |
| 2010/0130232 | A1 | 5/2010 | Dingler et al. | |
| 2012/0015665 | A1 | 1/2012 | Farley | |
| 2013/0179114 | A1 | 7/2013 | Weiss | |
| 2014/0018111 | A1 | 1/2014 | Farley et al. | |
| 2015/0163766 | A1 | 6/2015 | Weiss et al. | |

OTHER PUBLICATIONS

Yu-Chung Cheng, et al., "Accuracy characterization for metropolitan-scale Wi-Fi localization", 2005 MobiSys '05 Proceedings of the 3rd international conference on Mobile systems, applications, and services pp. 233-245.*

Basics of the GPS Technique: Observation Equations, Geoffrey Blewitt, Department of Geomatics, University of Newcastle upon Tyne, NE1 7RU, United Kingdom, geoffrey.blewitt@ncl.ac.uk.

* cited by examiner

Primary Examiner — Regis Betsch
(74) Attorney, Agent, or Firm — Dovas Law, P.C.

(57) ABSTRACT

A computer implemented method for determining the location of a target device is disclosed. A locate request is received for the target device. The locate request is forwarded. A locate for the target device in response to the locate request is received, the locate including a location and a location accuracy. The received location accuracy is compared with an accuracy threshold, and a calculated location of the target device is forwarded when the received location accuracy is not within the accuracy threshold.

9 Claims, 2 Drawing Sheets

SYSTEM AND METHOD FOR PROVIDING LOCATION INFORMATION

FIELD OF INVENTION

Figure 1:
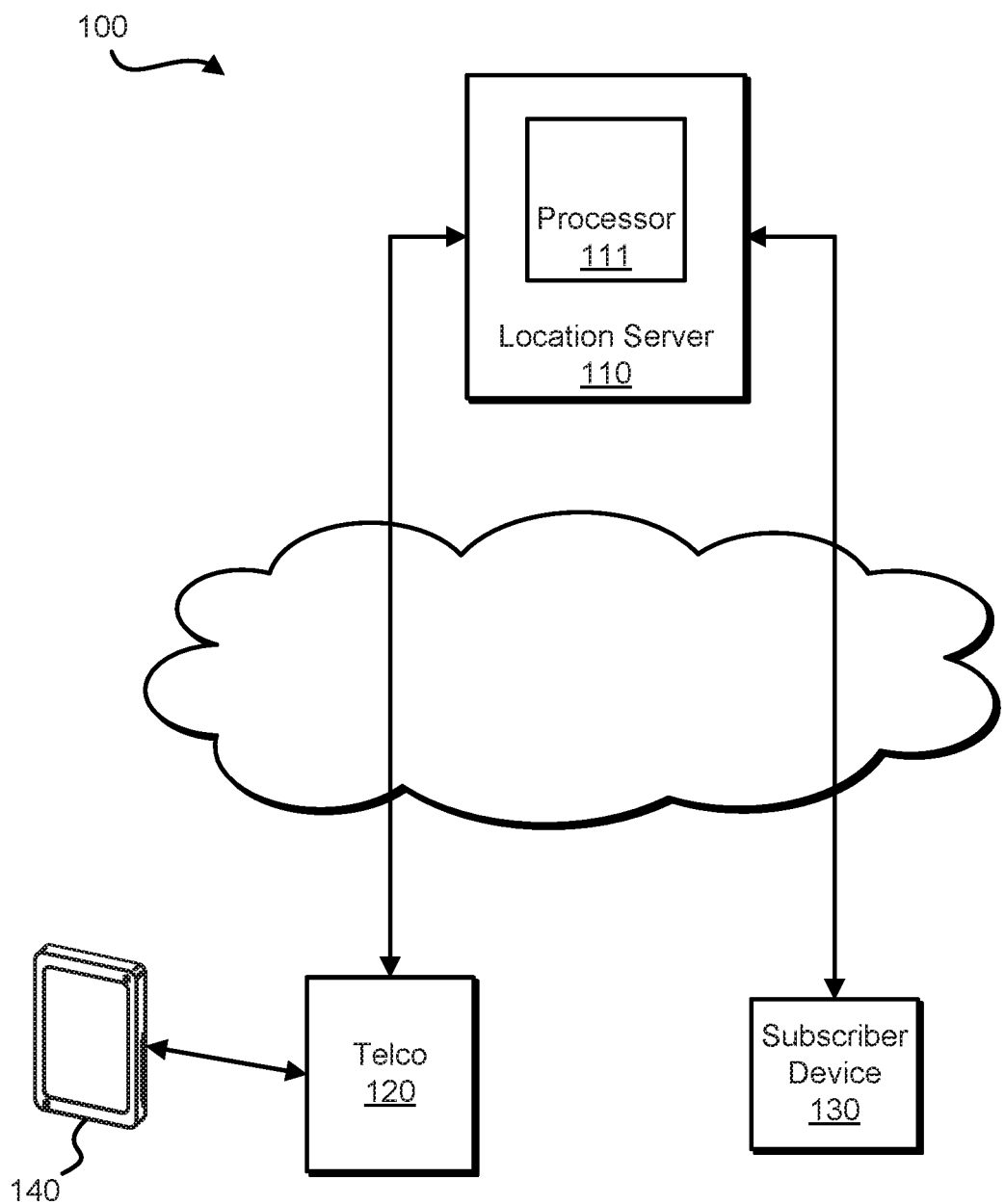

The present invention relates generally to communication networks. More specifically, the present invention relates to a system for providing a location in a wireless communication network.

BACKGROUND

Feature cell phones and other mobile subscriber devices may rely on telecommunication carrier (telco) cell tower location interpolation to derive location. The locate that is returned is a tuple, consisting of a latitude, longitude, and predicted accuracy of the latitude, longitude with respect to the actual location of the device at the time the location was derived. For some telcos, the average predicted accuracy of the locates is poor, with upwards of 45% having an accuracy worse than being in a radius of 0.2 miles from the actual location of the cell phone. Devices which rely on GPS technology, for example most smart phones, may also return poor accuracy locates. The algorithms and methods presented here will be applicable to these locates as well. Cell tower locates are derived from location interpolation, which utilizes the fixed location of at least 3 cell towers, combined with the signal strength between each cell tower and a given phone, to interpolate the location of that cell phone. GPS locates are derived from at least 3 satellites at fixed locations around the earth, and uses the time it takes for a signal to travel between a satellite and a given cell phone to determine the distance between that satellite and the cell phone. Measurements corresponding to a plurality of satellites are then used to determine the location of the cell phone.

There exists a need for an improved system and method for providing location information to a subscriber device.

SUMMARY

A computer implemented method for determining the location of a target device is disclosed. A locate request is received for the target device. The locate request is forwarded. A locate for the target device in response to the locate request is received, the locate including a location and a location accuracy. The received location accuracy is compared with an accuracy threshold, and a calculated location of the target device is forwarded when the received location accuracy is not within the accuracy threshold.

BRIEF DESCRIPTION OF THE DRAWING(S)

A more detailed understanding of the disclosed system and method may be had from the following description, given by way of example and to be understood in conjunction with the accompanying drawing.

Figure 2:
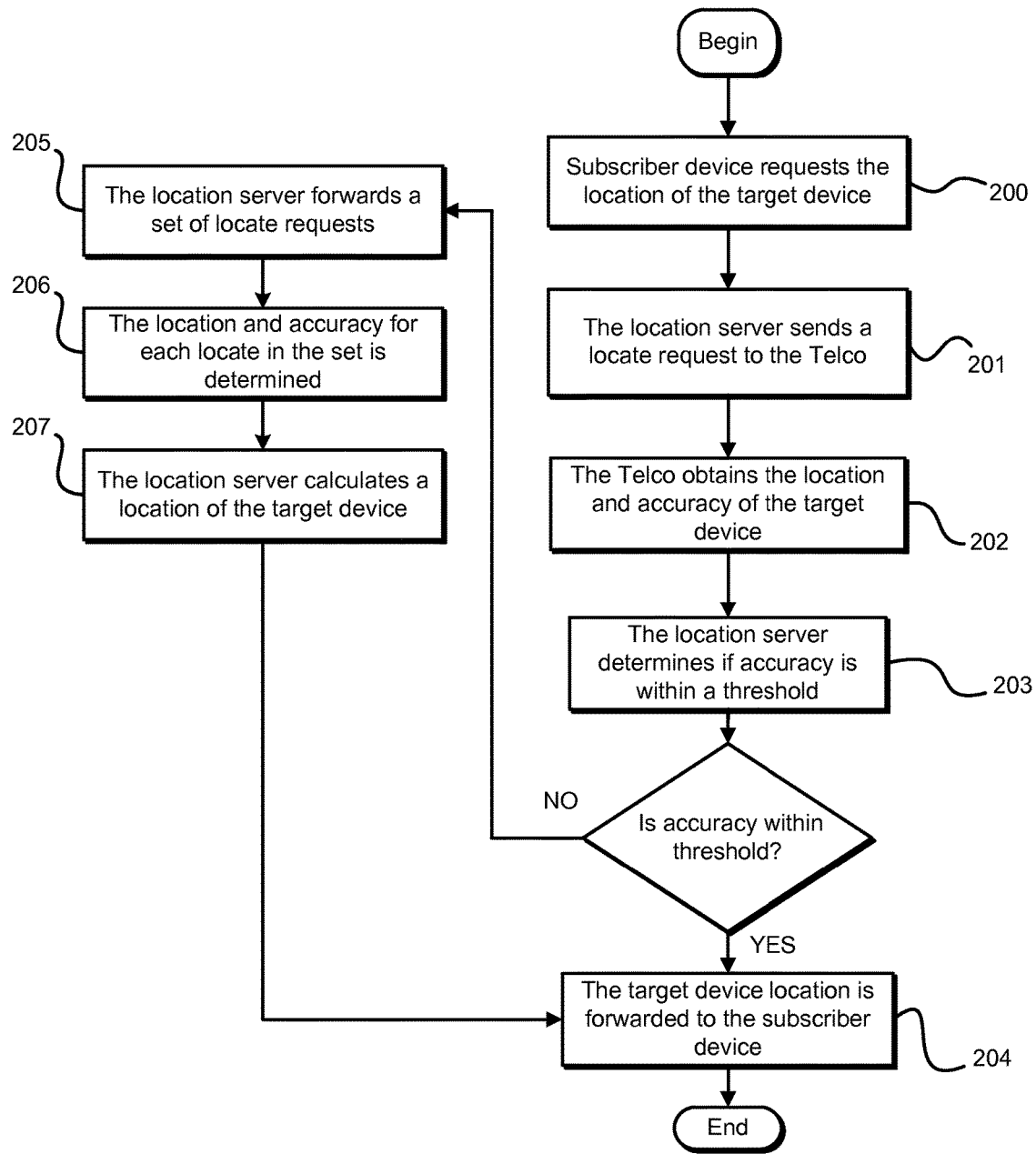

FIG. 1 is an example block diagram of communication system including the disclosed location system and method; and FIG. 2 is a flow diagram of the disclosed method for providing location information.

DETAILED DESCRIPTION

Although the features and elements are described in particular combinations, each feature or element can be used alone (without the other feature or elements) or in various combinations with or without other features and elements.

A system and method are disclosed for determining the location of a target device. FIG. 1 is an example block diagram of a communication system 100 in accordance with the disclosed method and system.

Referring to FIG. 1, communication system 100 comprises a telecommunications carrier system (hereinafter, "Telco") 120, a location server 110 comprising a processor 111, and a subscriber device 130. The location server 110, for providing location information of a target device 140 to the subscriber device 130, receives a locate request from the subscriber device 130 for the location of the target device 140. The location server 110, in communication with the subscriber device 130 and the Telco 120, forwards the locate request for the location of the target device 140 to the Telco 120.

Telco 120, in communication with the target device 140 and the location server 110, receives the locate request from the location server 110 and processes the location of the target device 140. The Telco 120 determines the accuracy of the processed location and forwards the locate, including the location and the determined accuracy, to the location server 110. The accuracy of the location processed by the Telco 120 may be determined for example as a function of the strength of the signal received by the Telco 120 from device 140.

The location server 110 receives the location and accuracy information from the Telco 120. The processor 111 then determines whether the accuracy of the received location is above an accuracy threshold. The accuracy threshold may be any value, such as a maximum radial distance around the actual location. In accordance with the disclosed method, the accuracy threshold is 0.2 mile radius around the actual location of the target device.

If the accuracy of the location of the target device 140 is within the accuracy threshold, the location server 110 forwards the location of the target device 140 to the subscriber device 130 as requested.

If the accuracy of the location of the target device 140 is not within the accuracy threshold, the location server 110 forwards a set of locate requests for the location of the target device 140 to the Telco 120. The Telco 120 again processes the location information from the target device 140 for each locate request in the set, determines the accuracy of the location, and forwards the set of locates to the location server 110. In accordance with the disclosed method, the set of locates includes N locate requests, N being any number, for example N=7.

In the disclosed method, each locate request in the set of locates may be performed serially, such that the next locate request is performed once the prior locate request has been completed by the Telco 120. Locates, in accordance with the disclosed method, may be described as tuples, (i.e., latitude$_i$, longitude$_i$, accuracy$_i$), where i ranges from 1 to N.

The location server 110 collects the set of locates from the Telco 120 and derives a weighted centroid of the set of locates. The weighted centroid may be calculated using the following:

$$\text{CentroidLatitude} = \Sigma(S - \text{accuracy}_i)/(S*(N-1))*\text{latitude}_i;$$

$$\text{CentroidLongitude} = \Sigma(S - \text{accuracy}_i)/(S*(N-1))*\text{longitude}_i;$$

where $S = \Sigma \text{accuracy}_i$, with the summation taken over i=1 to N. The CentroidLatitude and CentroidLongitude may then be used by the location server 110 as the predicted actual locate for the target device 140.

Once the predicted actual locate for the target device 140 is derived, the location server 110 forwards the predicted actual locate to the subscriber device 130.

FIG. 2 is an example flow diagram of the disclosed method. Referring to FIG. 2, a subscriber device forwards a locate request for a target device to a location server, Step 200. The location server receives the locate request and forwards the request to a Telco, Step 201. The Telco, in response to receiving the request, processes location information from the target device and determines the location accuracy, and forwards the location and the location accuracy to the location server, Step 202.

The location server then determines whether the received location accuracy is within an accuracy threshold, Step 203. If the location accuracy is within the accuracy threshold, the location server forwards the location of the target device to the subscriber device, Step 204.

If the location accuracy is not within the accuracy threshold, the location server forwards a determined number of locate requests for the target device to the Telco, Step 205. The Telco processes the location information for each of the N locate requests and forwards the set of locates, including the location information, to the location server, Step 206. The location server may then determine the location of the target device by calculating a weighted centroid of the set of locates, Step 207. Once the location server determines the location, the location server forwards the derived location of the target device to the subscriber device, Step 204.

In an alternative method, N may be adaptive. For example, if S/N is smaller than 0.2 mi, then fewer points may be used to derive the centroid. N may also be adapted to overall usage patterns. If the number of retrieved locates is high at a particular time, N can be decreased to adapt to the load on the Telco 120.

In another alternative, there may be situations for which it is known that higher locate accuracy may be required, or contra-wise, a lower degree of locate accuracy may be tolerable. For example, if the history of when locates are requested from a subscriber device is maintained at the location server, then locate requests by the subscriber device at an unusual time may require a higher degree of accuracy than normal. The subscriber device may also provide supply hints as to when a higher degree of locate accuracy is required.

The location server, in an alternative method, may determine the location of the target device using past history. The location server may maintain the past history of locates of the target device. Based on the past history, if there is a high likelihood that the target device will be at a particular location at a particular time, and a locate request returns a location of the target device that is near that particular location at the particular time, the location server may deduce that the target device 140 is at that particular location. Accordingly, the location server would forward the location to the subscriber device based on this deduction.

If the system has access to tagged landmarks, and a history is maintained such that the target device has a statistical likelihood of being near a particular location at a particular time, and the target device is in fact near such a landmark at that particular time, then it can be deduced that the phone is at that landmark.

What is claimed is:

1. A computer-implemented method for determining a location of a first device comprising:
   receiving a locate request for the first device from a second device via a network;
   forwarding the locate request for the first device;
   receiving a locate for the first device in response to the locate request, the locate including a location and a location accuracy, the location including a latitude and longitude;
   comparing the received location accuracy with an accuracy threshold;
   forwarding to a telecommunication carrier system a set of repeat locate requests for the first device when the received location accuracy is not within the accuracy threshold;
   receiving a set of locates for the first device, the set of locates comprising a plurality of locations and plurality of location accuracies, the plurality of locations comprising latitudes and longitudes;
   calculating a location of the first device based on the set of locates, wherein calculating the location of the first device comprises determining a weighted centroid of the set of locates; and
   forwarding the calculated location of the first device to the second device;
   wherein the weighted centroid is:

$$\text{CentroidLatitude} = \Sigma(S - \text{accuracy}_i)/(S*(N-1))* \text{latitude}_i;$$

and $$\text{CentroidLongitude} = \Sigma(S - \text{accuracy}_i)/(S*(N-1))* \text{longitude}_i;$$

where $S = \Sigma \text{accuracy}_i$, with the summation taken over $i=1$ to N; where N is the number of locates in the set of locates.

2. The computer-implemented method of claim 1, further comprising forwarding the received location of the first device when the location accuracy is within the accuracy threshold.

3. The computer-implemented method of claim 1, the set of repeat locate requests comprising at least seven (7) serially performed locate requests.

4. The computer-implemented method of claim 1, further comprising:
   determining a locate loading on the telecommunication carrier system; and
   determining the number of locate requests to be forwarded based on the determined locate loading on the telecommunication carrier system.

5. The computer-implemented method of claim 1, further comprising:
   maintaining a historic record of locate request times for the first device;
   comparing the time of the locate request to the times of prior requests stored in the historic record; and
   determining the accuracy threshold based on the comparison of the time of the locate request and the times of the prior requests.

6. The computer-implemented method of claim 1, wherein the repeat locate requests are performed serially, wherein it is determined that the telecommunication carrier system completes the processing of a particular location request prior to initiating a subsequent location request.

7. A location server for determining a location of a first device comprising a processor for performing a computer-implemented method, the method including:
   receiving a locate for the first device in response to a locate request from a second device via a network, the locate including a location and a location accuracy, the location including a latitude and longitude;

comparing the received location accuracy with an accuracy threshold;

forwarding to a telecommunication carrier system a set of repeat locate requests for the first device when the received location accuracy is not within the accuracy threshold;

receiving a set of locates for the first device, the set of locates comprising a plurality of locations and plurality of location accuracies, the plurality of locations comprising latitudes and longitudes;

calculating a location of the first device based on the set of locates, the calculating the location comprising determining a weighted centroid of the set of locates; and forwarding the calculated location of the first device to the second device;

wherein the weighted centroid is:

$$\text{CentroidLatitude} = \Sigma(S - \text{accuracy}_i)/(S^*(N-1))^* \text{latitude}_i;$$

and $$\text{CentroidLongitude} = \Sigma(S - \text{accuracy}_i)/(S^*(N-1))^* \text{longitude}_i;$$

where $S = \Sigma \text{accuracy}_i$, with the summation taken over $i=1$ to N; where N is the number of locates in the set of locates.

8. The location server of claim 7, wherein the computer-implemented method further includes forwarding the received location of the first device when the location accuracy is within the accuracy threshold.

9. The location server of claim 7, wherein in the method for performance by the processor the repeat locate requests are performed serially, wherein it is determined that the telecommunication carrier system completes the processing of a particular location request prior to initiating a subsequent location request.

* * * * *